July 24, 1934.　　　C. L. FREELAND　　　1,967,237
NUT LOCK
Filed Jan. 23, 1933
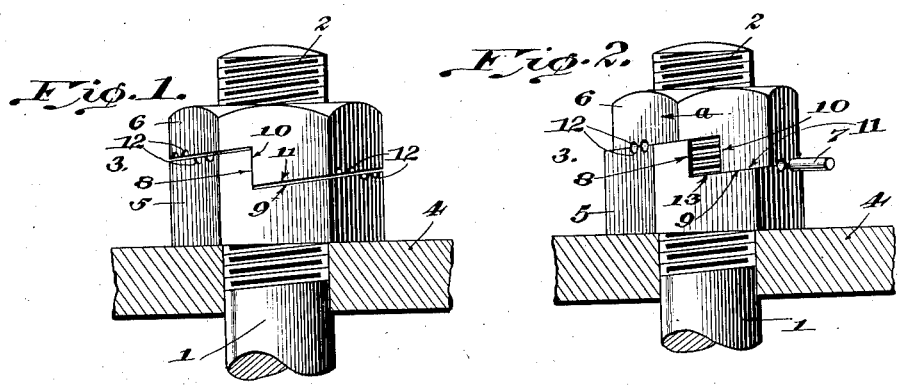
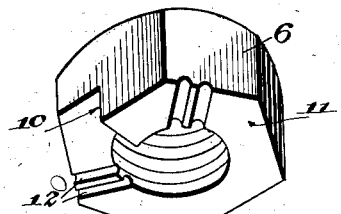
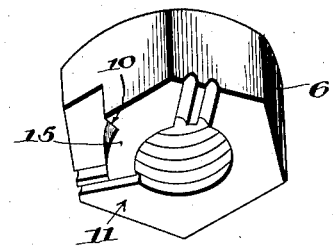
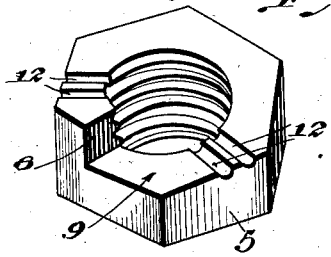
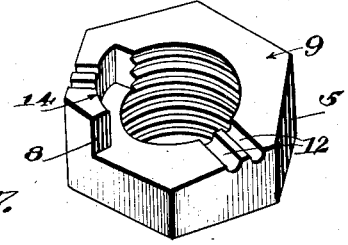
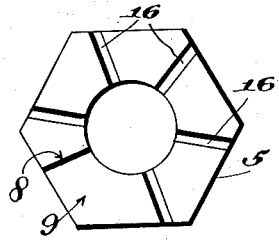
WITNESSES
INVENTOR
Claude L. Freeland,
BY
ATTORNEYS Patented July 24, 1934

1,967,237

UNITED STATES PATENT OFFICE 1,967,237

NUT LOCK

Claude L. Freeland, Bristow, Okla.

Application January 23, 1933, Serial No. 653,160

1 Claim. (Cl. 151—16)

This invention relates to improvements in nut locks, and its object is as follows:—

To provide a nut lock wherein the main and check nuts have an interengaging tongue and channel, the purpose of the tongue being to cover the threads of the bolt at the opening resulting from the backing up of the check nut into its locking position, said tongue then acting as a closure to exclude dirt.

In the drawing:

Figure 1 is a side elevation of the nut lock illustrating the initial position of the main and check nuts immediately after screwing the two hard against an abutment.

Figure 2 is a similar view illustrating how the check nut is backed up to make the lock and how a shearable pin is inserted in the matching grooves to secure the check nut.

Figure 3 is an inverted perspective view of the check nut.

Figure 4 is a perspective view of the main nut.

Figure 5 is an inverted perspective view of the check nut illustrating the tongue which acts as a closure.

Figure 6 is a perspective of the main nut particularly illustrating the channel with which the tongue interengages.

Figure 7 is a plan view of the main nut illustrating a radial arrangement of grooves situated at rather widely spaced circumferential points.

In the drawing, 1 designates a bolt or other cylindrical member which is threaded at 2 to receive the nut 3 which is intended to be screwed home against an abutment 4 to clamp the latter tightly against some other part. The nut 3 comprises several parts and these are collectively considered the improved nut lock.

The parts referred to are the main nut 5, the check nut 6 and a pin 7 (Fig. 2), there actually being a plurality of the latter as presently appears. The main nut 5 has a substantially upright shoulder 8, the top and bottom extremities of which mark the terminals of a ramp or cam surface 9 which is 360° in circumferential extent. The check nut 6 has a corresponding substantially upright shoulder 10, the top and bottom of which also mark the terminals of a matching ramp or cam surface 11 360° in circumferential extent.

By making the matching cam surfaces 9, 11 continuous for 360° it is possible to have a gradual incline which tends to hold the check nut 6 in its backed-up position (Fig. 2) far more firmly than if these surfaces were made abrupt as would be the case if the confronting surfaces of the two nuts were interrupted with more than one pair of shoulders 8, 10. The pitch of the cam surfaces 9, 11 is only a little more than that of the threads 2. This regulates the height of the shoulders 8, 10, and insures the gradual inclination just mentioned.

In the form of the invention in Figures 1 to 4 the confronting cam surfaces are provided with series of two or more grooves 12, formed rather closely together at one or more radial points (Figs. 3 and 4). In originally screwing the nut 3 home (Fig. 1) these grooves are out of registration. Later the check nut 6 is backed up until certain ones or all of the grooves register. A pin or pins 7 are then driven in as suggested in Figure 2.

The pin 7 is made of a material which is capable of being sheared by turning the check nut 6 in the direction $a$ when it is desired to release the nut lock. A metal such as brass or copper will be entirely adequate to lock the check nut 6 with respect to the main nut 5 because even extraordinary vibrations to which the nut lock may be subjected will not be sufficient to cause the shearing of even a much softer metal. But brass or copper will yield to the power of a wrench applied to the check nut 6 when directed as indicated by the arrow $a$.

When the check nut 6 is backed up as in Figure 2, the separation of the shoulders 8, 10 leaves an opening 13. In many instances this will do no harm, but in some cases it is desirable to cover the threads seen through the opening (Fig. 2) and for that purpose the nut lock is made as shown in Figures 5 and 6. Here the main nut 5 has a segmental channel 14 which takes the corresponding tongue 15 of the check nut 6. The channel 14 and tongue 15 branch from the respective shoulders 8, 10, and when the two nuts are fitted together as in Figure 1 the tongue and channel will fit together also. Now when the check nut 6 is backed up as in Figure 2 the tongue 15 will be drawn across the opening 13, concealing the threads and excluding dirt.

It is to be observed that the channel 14 is an internal channel since it communicates with the threaded bore of the respective nut 5. The tongue 15 is an internal tongue, also coming next to the threaded bore of the respective nut 6. In addition to forming the threads of the bolt within the zone of the nut lock, the tongue 15 is protected in a large measure since it does not occur so nearly adjacent to the outer surface of the nut 6 as to be in position where it can be struck and damaged.

In lieu of making the grooves 12 in series of two or more as in Figures 1 to 6 they may be made in singles as at 16 (Fig. 7) and situated at more widely spaced circumferential points. Figure 7 is intended to illustrate the main nut 5. There will be a corresponding arrangement of grooves in the companion check nut. At first the grooves do not register as in Figure 1, but they will register to form complete holes when the check nut is backed up, thus to permit the driving in of a lock pin such as 7.

The operation is readily understood. Upon desiring to screw the nut 3 onto threads 2 the two members 5, 6 are held together as one and are so screwed on by hand. The tendency will be to have the shoulders 8, 10 in abutment with each other, but if they should be spaced slightly from each other the composite nut can be screwed home nevertheless. There is a perceptible looseness between the two nuts 5, 6, and this looseness accounts for the permissible spacing of the shoulders 8, 10 in screwing the nut 3 home.

This perceptible looseness also prevents any jamming of the check nut 6 against the main nut 5 in the initial screwing home. The wrench will presumably embrace both nuts, and in screwing them in the clockwise direction (looking in from the uppermost end of the bolt 1) the main nut 5 will be tightened against the abutment 4 but the check nut 6 will not be tightened. The shoulder 10 of the check nut acts against the shoulder 8 and aids in driving the main nut 5 hard against the abutment 4. This is especially so in case of having to use the check nut 6 as the driver. The shoulders 8 and 10 will then abut hard against each other, but there will not be any jamming between the cam surfaces 9, 11, first because there is an initial looseness between them, second because the inclination of the cam surfaces is in the general direction of the threads.

Having screwed the main nut 5 against the abutment 4 as hard as it will go, the operator can readily back the check nut 6 up with his fingers. But the distance is not very great, being only as far as the loose play at 9, 10 will permit. As yet the grooves 12 are supposed to be out of registration. A separate wrench is now applied to the check nut 6, and this is turned reversely as though unscrewing it from the bolt 1. The cam surface 10 will ride back upon the cam surface 9 and jam tightly thereagainst. The cam surfaces must be wiped dry before applying the nut so that the frictional moment will be greater. Some or all of the grooves 12 will now be in registration. One or more pins 7 will be driven into the completed holes.

Upon desiring to remove the nut lock 3 from the bolt 1, a wrench is applied to the check nut 6 and turned in the direction of the arrow $a$. This not only loosens the check nut but also shears the pin or pins 7. This shearing makes it unnecessary to attempt to pick the pins out. This would be practically impossible because after driving the pins home they will be slightly swaged with a center punch. Having loosened the check nut 6 the two nuts will be unscrewed from the bolt 1. This principle of operation applies to the modifications in Figures 5, 6 and 7 as well as to the main form in Figures 1 to 4.

I claim:—

A nut lock comprising complemental main and check nuts the bores of which are threaded to be screwed home simultaneously upon the threads of a member, a continuous cam surface on each nut and a substantially upright shoulder at which the ends of the respective cam surface terminate, said surfaces confronting each other and the shoulders being in abutment when screwing the nut lock home, one of the shoulders having an internal channel in communication with the threaded bore, and an internal tongue extending from the other shoulder interengaging with the channel to form a closure when the cam surfaces are jammed into locking position whereat the shoulders are separated to leave an opening.

CLAUDE L. FREELAND.